United States Patent
Ando

(10) Patent No.: US 10,503,382 B2
(45) Date of Patent: Dec. 10, 2019

(54) DEVICE AND INFORMATION PROCESSING METHOD

(71) Applicant: Mitsuo Ando, Fukuoka (JP)

(72) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 202 days.

(21) Appl. No.: 15/283,504

(22) Filed: Oct. 3, 2016

(65) Prior Publication Data

US 2017/0102865 A1    Apr. 13, 2017

(30) Foreign Application Priority Data

Oct. 8, 2015 (JP) ................................. 2015-199968

(51) Int. Cl.
  *G06F 3/048* (2013.01)
  *G06F 3/0484* (2013.01)
  *H04N 1/00* (2006.01)
  *G06F 3/0488* (2013.01)

(52) U.S. Cl.
  CPC ..... *G06F 3/04847* (2013.01); *H04N 1/00206* (2013.01); *H04N 1/00209* (2013.01); *H04N 1/00241* (2013.01); *H04N 1/00307* (2013.01); *H04N 1/00474* (2013.01); *H04N 1/00482* (2013.01); *H04N 1/00938* (2013.01); *H04N 1/00962* (2013.01); *H04N 1/00973* (2013.01);
  (Continued)

(58) Field of Classification Search
  None
  See application file for complete search history.

(56) References Cited

U.S. PATENT DOCUMENTS 6,321,266 B1 * 11/2001 Yokonnizo ......... H04N 1/32358
                                                                   358/400
8,432,562 B2    4/2013 Ando et al.
(Continued)

FOREIGN PATENT DOCUMENTS

JP    H10-301723    11/1998
JP    2009-65308    3/2009
(Continued)

OTHER PUBLICATIONS

Japanese Office Action for 2015-199968 dated Jul. 9, 2019.

*Primary Examiner* — Hua Lu

(74) *Attorney, Agent, or Firm* — IPUSA, PLLC

(57) ABSTRACT

A device includes a device control unit that controls the device to execute a process based on setting information received via a first interface for accepting a process execution request, and an application unit that displays a first screen for accepting a specific setting relating to the process from a user and sends to the device control unit, via the first interface, the setting information that is based on the specific setting accepted via the first screen. The application unit accepts from an application program installed in the device, via a second interface, a display request for displaying the first screen, and sends information indicating the specific setting accepted via the first screen to the application program as a response to the display request. The information indicating the specific setting sent to the application program has the same configuration as the setting information sent to the device control unit.

18 Claims, 8 Drawing Sheets

| SETTING ITEM | AVAILABLE SETTING VALUES | INITIAL VALUE |
|---|---|---|
| SCANNING SIDE | ... | ONE SIDE |
| PAPER SIZE | ... | A4 |
| COLOR | ... | BLACK & WHITE |
| RESOLUTION | ... | 600 |
| FILE FORMAT | ... | PDF |
| MULTI-PAGE FORMAT | TRUE, FALSE | TRUE |
| COMPRESSION METHOD | ... | MMR |
| ⋮ | ⋮ | ⋮ |

(52) U.S. Cl.
CPC .. *G06F 3/04883* (2013.01); *H04N 2201/0094* (2013.01)

(56) References Cited

U.S. PATENT DOCUMENTS

| | | | | |
|---|---|---|---|---|
| 8,438,217 | B2* | 5/2013 | Osada | H04N 1/00204 709/201 |
| 8,988,693 | B2 | 3/2015 | Ando | |
| 9,124,733 | B2 | 9/2015 | Ando | |
| 9,164,865 | B2 | 10/2015 | Ando et al. | |
| 9,235,453 | B2 | 1/2016 | Ando | |
| 9,374,288 | B2 | 6/2016 | Ando | |
| 9,374,490 | B2 | 6/2016 | Ando | |
| 9,560,233 | B2* | 1/2017 | Hanano | H04N 1/00962 |
| 9,628,645 | B2* | 4/2017 | Sato | H04N 1/00222 |
| 2007/0211310 | A1* | 9/2007 | Kadota | H04N 1/00344 358/474 |
| 2011/0055366 | A1* | 3/2011 | Okamura | G06F 21/629 709/223 |
| 2012/0243035 | A1* | 9/2012 | Takaoka | H04N 1/00225 358/1.15 |
| 2013/0141743 | A1* | 6/2013 | Miyazawa | H04N 1/4426 358/1.13 |
| 2013/0235402 | A1* | 9/2013 | Yamamichi | G06F 3/1204 358/1.13 |
| 2014/0036291 | A1* | 2/2014 | Fujishita | G06K 15/005 358/1.13 |
| 2014/0082581 | A1* | 3/2014 | Ohhashi | G06F 8/30 717/100 |
| 2014/0092413 | A1* | 4/2014 | Shibata | H04N 1/00204 358/1.13 |
| 2014/0146363 | A1 | 5/2014 | Hirokawa et al. | |
| 2014/0200426 | A1* | 7/2014 | Taub | A61B 5/14532 600/347 |
| 2014/0370819 | A1* | 12/2014 | Asai | G06F 3/1226 455/41.3 |
| 2015/0186188 | A1 | 7/2015 | Ando | |
| 2015/0281332 | A1 | 10/2015 | Naito et al. | |
| 2015/0326751 | A1 | 11/2015 | Ando | |
| 2015/0381828 | A1 | 12/2015 | Ando et al. | |
| 2016/0080587 | A1 | 3/2016 | Ando | |
| 2016/0094754 | A1* | 3/2016 | Miyazawa | H04N 1/32475 358/1.13 |
| 2016/0119506 | A1 | 4/2016 | Namihira et al. | |
| 2016/0185147 | A1* | 6/2016 | Iguchi | B41J 29/36 347/110 |
| 2016/0381237 | A1* | 12/2016 | Sakaida | H04N 1/00437 358/1.15 |

FOREIGN PATENT DOCUMENTS

| | | |
|---|---|---|
| JP | 2011-087327 | 4/2011 |
| JP | 2013-186835 | 9/2013 |
| JP | 2014-59718 | 4/2014 |
| JP | 2015-79326 | 4/2015 |

* cited by examiner

| SETTING ITEM | AVAILABLE SETTING VALUES | INITIAL VALUE |
|---|---|---|
| SCANNING SIDE | ... | ONE SIDE |
| PAPER SIZE | ... | A4 |
| COLOR | ... | BLACK & WHITE |
| RESOLUTION | ... | 600 |
| FILE FORMAT | ... | PDF |
| MULTI-PAGE FORMAT | TRUE, FALSE | TRUE |
| COMPRESSION METHOD | ... | MMR |
| ⋮ | ⋮ | ⋮ |

DEVICE AND INFORMATION PROCESSING METHOD

CROSS-REFERENCE TO RELATED APPLICATIONS

The present application claims priority under 35 U.S.C. § 119 to Japanese Patent Application No. 2015-199968 filed on Oct. 8, 2015, the entire contents of which are incorporated herein by reference.

BACKGROUND OF THE INVENTION

1. Field of the Invention

The present invention relates to a device and an information processing method.

2. Description of the Related Art

Techniques are known for enabling image forming apparatuses and other devices to install a new application program that has been developed based on an API (Application Programming Interface) that was published after the devices have been deployed. Such application program may enable functions of the device to cooperate with various services, for example.

SUMMARY OF THE INVENTION

According to one embodiment of the present invention, a device is provided that includes a device control unit configured to control the device to execute a process based on setting information that is received via a first interface configured to accept a process execution request for the device, and an application unit configured to display a first screen configured to accept a specific setting relating to the process from a user, and send to the device control unit, via the first interface, the setting information that is based on the specific setting that has been accepted via the first screen. The application unit accepts from an application program that is installed in the device, via a second interface, a display request for displaying the first screen, and sends information indicating the specific setting that has been accepted via the first screen to the application program as a response to the display request. The information indicating the specific setting that is sent to the application program has the same configuration as the setting information that is sent to the device control unit via the first interface.

DESCRIPTION OF THE EMBODIMENTS

An aspect of the present invention relates to simplifying the implementation of an application program for a device.

In the following, embodiments of the present invention are described with reference to the accompanying drawings.

Figure 1:
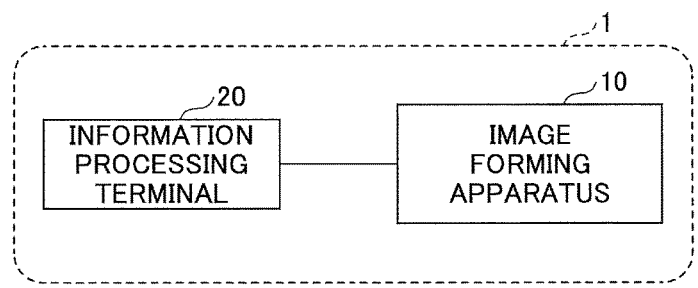
FIG. 1 is a diagram illustrating an example configuration of an information processing system according to a first embodiment of the present invention.

FIG. 1 is a diagram illustrating an example configuration of an information processing system 1 according to a first embodiment of the present invention. In FIG. 1, the information processing system 1 includes an image forming apparatus 10 and an information processing terminal 20 that are connected to each other via a network. Communication between the image forming apparatus 10 and the information processing terminal 20 may be established via a USB (Universal Serial Bus); short-range wireless communication, such as Bluetooth (registered trademark) or infrared communication; or a network, such as a wired or wireless LAN, for example.

The image forming apparatus 10 is an example of a device. The image forming apparatus 10 of the present embodiment is a multifunction peripheral (MFP) that is capable of implementing two or more imaging functions, such as printing, scanning, copying, and/or fax transmission/reception within a single housing. Note, however, that in other embodiments, the image forming apparatus 10 may be a device implementing only one of the above imaging functions, for example. Also, other devices, such as a projector, a video conference system, or a digital camera, may be used instead of the image forming apparatus 10, for example.

The information processing terminal 20 is an electronic device that is capable of independently executing and completing an information processing operation. For example, the information processing terminal 20 may be a smartphone or a tablet terminal. In the present embodiment, the information processing terminal 20 functions as an operation panel (operation unit) of the image forming apparatus 10.

The information processing terminal 20 may be fixed at a predetermined position of the image forming apparatus 10, for example. In this respect, the information processing terminal 20 and the image forming apparatus 10 may be regarded as one single device or apparatus. Alternatively, the information processing terminal 20 may be arranged to be removable (detachable) from the image forming apparatus 10.

Figure 2:
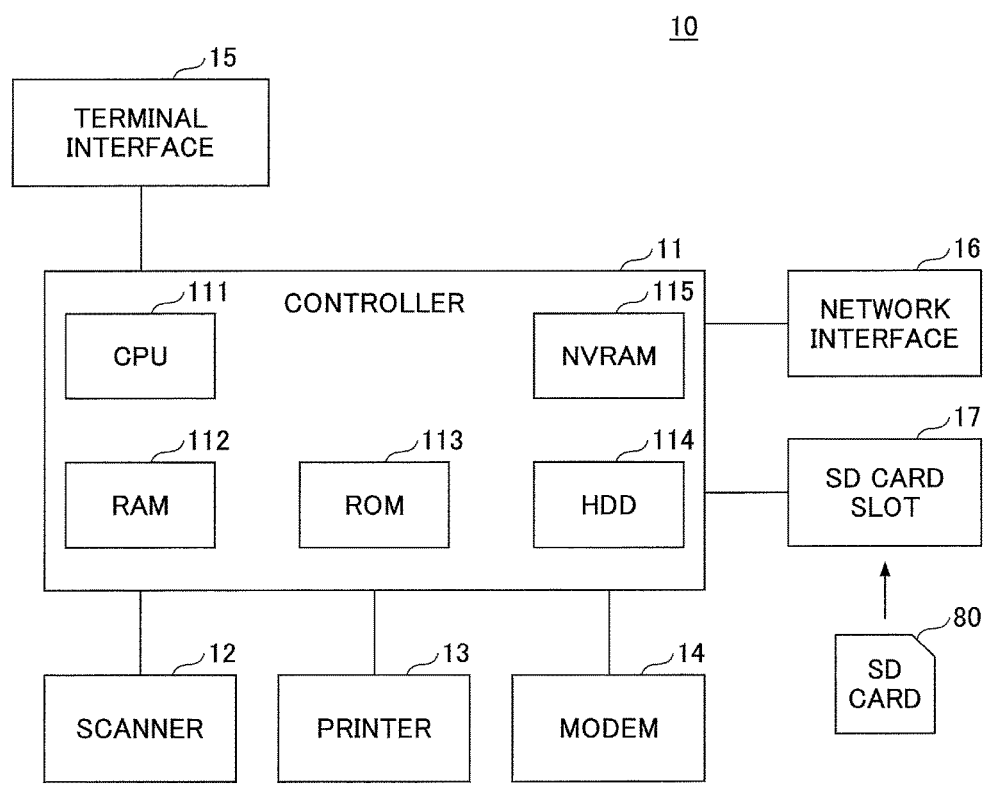
FIG. 2 is a block diagram illustrating an example hardware configuration of an image forming apparatus according to the first embodiment.

FIG. 2 is a block diagram illustrating an example hardware configuration of the image forming apparatus 10 according to the first embodiment. In FIG. 2, the image forming apparatus 10 includes hardware components, such as a controller 11, a scanner 12, a printer 13, a modem 14, a terminal interface 15, a network interface 16, and an SD card slot 17.

The controller 11 includes a CPU 111, a RAM 112, a ROM 113, an HDD 114, and an NVRAM 115. The ROM 113 stores various programs and data used by the various programs. The RAM 112 is used as a storage area for loading programs and as a working area for executing the loaded programs. The CPU 111 implements various functions by executing the programs loaded in the RAM 112. The HDD 114 stores programs and various types of data to be used by the programs. The NVRAM 115 stores various types of setting information and the like.

The scanner 12 is hardware for scanning a document to obtain image data of the document. The printer 13 is hardware for printing print data on printing paper (printing medium). The modem 14 is hardware for establishing connection with a telephone line and is used to transmit and receive image data through fax communication. The terminal interface 15 is an interface for establishing communication (connection) with the information processing terminal 20. For example, the terminal interface 15 may be a USB interface or hardware for enabling short-range wireless communication. Alternatively, the terminal interface 15 may be hardware for establishing connection with a wired or wireless network, such as a LAN, for example. The network interface 16 is hardware for establishing connection with a wired or wireless network, such as a LAN. The SD card slot 17 is used to read a program stored in an SD card 80. That is, in the image forming apparatus 10, not only programs stored in the ROM 113 but also programs stored in the SD card 80 may be loaded in the RAM 112. Note that in other embodiments, the SD card 80 may be replaced by some other type of recording medium, such as a CD-ROM or a USB (Universal Serial Bus) memory, for example. That is, although the SD card 80 is used in the present embodiment, the recording medium used is not limited to a particular type of recording medium. In the case where a type of recording medium other than the SD card 80 is used, the SD card slot 17 may simply be replaced by hardware compatible with the corresponding type of recording medium used.

Figure 3:
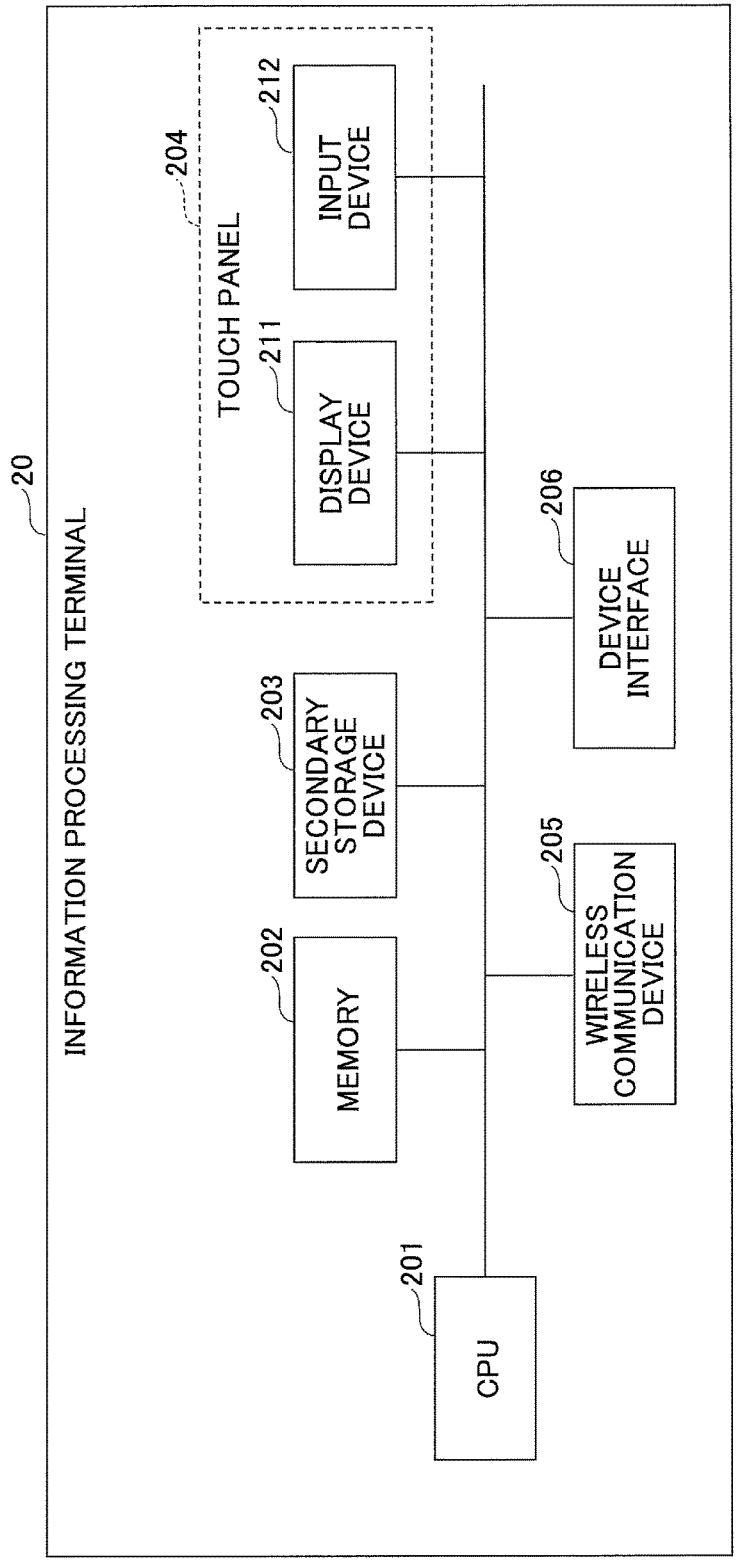
FIG. 3 is a block diagram illustrating an example hardware configuration of an information processing terminal according to the first embodiment.

FIG. 3 is a block diagram illustrating an example hardware configuration of the information processing terminal 20 according to the first embodiment. In FIG. 3, the information processing terminal 20 includes a CPU 201, a memory 202, a secondary storage device 203, a touch panel 204, a wireless communication device 205, and a device interface 206.

The secondary storage device 203 stores programs installed in the information processing terminal 20. The memory 202 stores a program that is read from the secondary storage device 203 in response to a start instruction for starting the program. The CPU 201 implements functions of the information processing terminal 20 by executing the program stored in the memory 202.

The touch panel 204 is an electronic component including both an input function and a display function. The touch panel 204 displays information and accepts an input from a user. The touch panel 204 includes a display device 211 and an input device 212.

The display device 211 may be a liquid crystal display, for example, and implements the display function of the touch panel 204. The input device 212 is an electronic component that includes a sensor for sensing contact of a contact object with the display device 211. The technology used for sensing contact of the contact object is not particularly limited and may be any technology, such as electrostatic technology, resistive technology, or optical technology, for example. Note that the contact object refers to an object that comes into contact with a contact surface (surface) of the touch panel 204. An example of such an object includes a finger of a user, a dedicated pen, or a general-purpose pen, for example.

Figure 4:
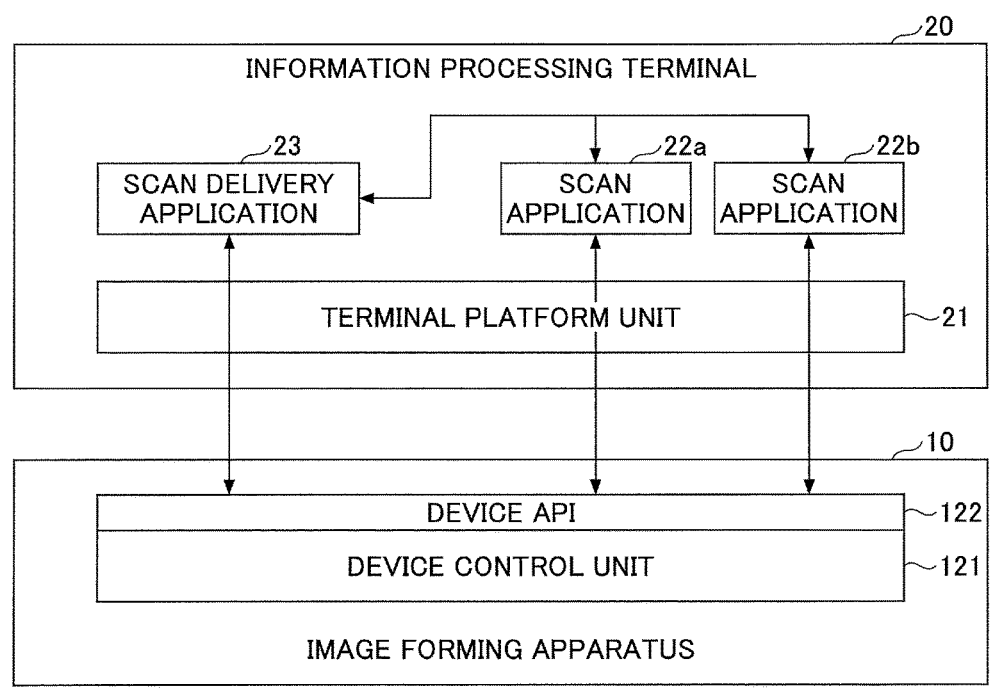
FIG. 4 is a block diagram illustrating an example functional configuration of the information processing system according to the first embodiment.

The wireless communication device 205 is an electronic component, such as an antenna, that is used for establishing communication in a wireless LAN (Local Area Network) environment or a mobile communication network environment, for example. The device interface 206 is an interface for communicating with the image forming apparatus 10. That is, the device interface 206 is configured to use a communication protocol corresponding to that used by the terminal interface 15 to establish communication with the image forming apparatus 10. FIG. 4 is a diagram showing an example functional configuration of the information processing system 1 according to the first embodiment. In FIG. 4, the information processing terminal 20 includes a terminal platform unit 21, a scan application 22a, a scan application 22b, and a scan delivery application 23.

The terminal platform unit 21 functions as a platform for an application program that is installed in the information processing terminal 20. The terminal platform unit 21 may be implemented by the CPU 201 executing a process based on one or more programs installed in the information processing terminal 20, for example. Also, the terminal platform unit 21 may be implemented by an OS (Operating System) of the information processing terminal 20, for example.

The scan application 22a, the scan application 22b, and the scan delivery application 23 are examples of application programs that are installed in the information processing terminal 20.

The scan application 22a and the scan application 22b are application programs for prompting the image forming apparatus 10 to scan a document. For example, the scan application 22a and the scan application 22b may be standard application programs pre-installed in the information processing terminal 20.

Note that the scan application 22b may be an application program that allows more detailed settings relating to scanning (also referred to as "scan settings" hereinafter) to be set up as compared with the scan settings that can be set up by the scan application 22a, for example. That is, the scan application 22a may be an application program for executing a simpler operation as compared with the operation to be executed by the scan application 22b, for example. Alternatively, the scan application 22b may be a newer version of the scan application 22a. For example, the scan application 22b may be an enhanced version of the scan application 22a with enhanced functions for enabling more detailed scan settings to be set up. In this case, the scan application 22a and the scan application 22b do not have to be installed in the information processing terminal 20 at the same time. For example, the scan application 22b may be installed after the scan application 22a is uninstalled.

In the present embodiment, it is assumed that a GUI (Graphical User Interface), such as a setting screen, of the scan application 22a is different from a corresponding GUI of the scan application 22b. Also, note that in the following descriptions, the scan application 22a and the scan application 22b may generically be referred to as "scan application 22" when one does not need to be distinguished from the other.

The scan delivery application 23 is an application program for prompting the image forming apparatus 10 to scan a document and deliver scanned image data of the document to a delivery destination. Note that the scan delivery application 23 may be an application program that has been developed by a third party vendor and installed in the information processing terminal 20 by a user (or by a service engineer acting upon request by the user), for example.

In the present embodiment, the scan application 22 includes an interface for accepting a request from another application program (the scan delivery application 23 in the present example). For example, the scan application 22 may include an interface for accepting a scan setting screen display request for displaying a scan setting screen and an interface for accepting a scan execution request. In this way, the scan delivery application 23 may be able to use the functions of the scan application 22 by calling these interfaces. Thus, the scan delivery application 23 may not have to include implementations relating to the scan setting screen and implementations relating to a scan progress screen that is displayed during the execution of a scan job, for example.

Meanwhile, the image forming apparatus 10 includes a device control unit 121. The device control unit 121 may be implemented by the CPU 111 executing a process based on one or more programs installed in the image forming apparatus 10, for example. The device control unit 121 includes a device API 122. The device control unit 121 controls the image forming apparatus 20 to execute a process based on a request received via the device API 122. The device API 122 is an API for accepting a request from an application program that is installed in the information processing terminal 20. That is, each application program installed in the information processing terminal 20 is capable of calling the device API 122 via the terminal platform unit 21. In the present embodiment, the device API 122 is implemented as a web API. That is, the device API 122 interacts with an application program using HTTP (HyperText Transfer Protocol) communication. In this case, a URL (Uniform Resource Locator) that is specified in an HTTP request may indicate the type and details of a request. However, the communication protocol for implementing the device API 122 is not limited to HTTP. The device API 122 also may be implemented using other communication protocols.

Figure 5:
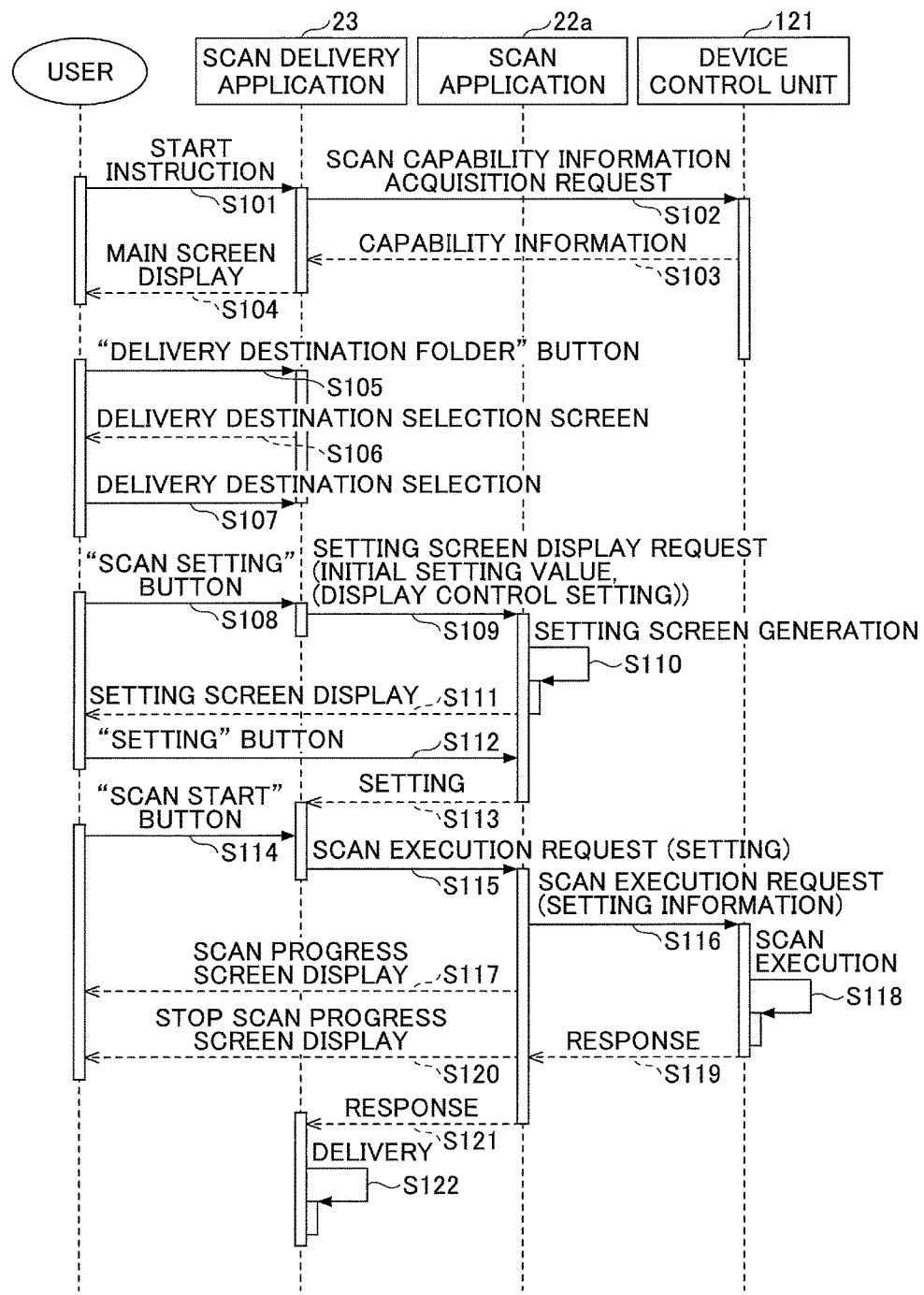
FIG. 5 is a sequence chart illustrating an example process procedure executed with respect to a scan delivery application.

In the following, a process procedure executed in the information processing system 1 according to the present embodiment is described. FIG. 5 is a sequence chart illustrating an example process procedure executed with respect to the scan delivery application 23. In the example of FIG. 5, the scan application 22a is used by the scan delivery application 23.

At the start of the process procedure of FIG. 5, a home screen including icons corresponding to the scan delivery application 23 and the scan application 22a may be displayed on the display device 211. When a start instruction for starting the scan delivery application 23 is input by a user that touches the icon corresponding to the scan delivery application 23, for example (step S101), the scan delivery application 23 sends an acquisition request for acquiring capability information relating to scanning to the device control unit 121 via the device API 122 (step S102). The capability information relating to scanning refers to information indicating the configuration of setting information relating to scanning. The configuration of setting information relating to scanning refers to information indicating setting items included in the setting information relating to scanning and available setting values that can be set up for the setting items. That is, the capability information relating to scanning is information indicating various setting items and setting values relating to scanning that can be set up via the device API 122.

The device control unit 121 sends the capability information relating to scanning to the scan delivery application 23 as a response to the acquisition request via the device API 122 (step S103).

Figures 6, 7:
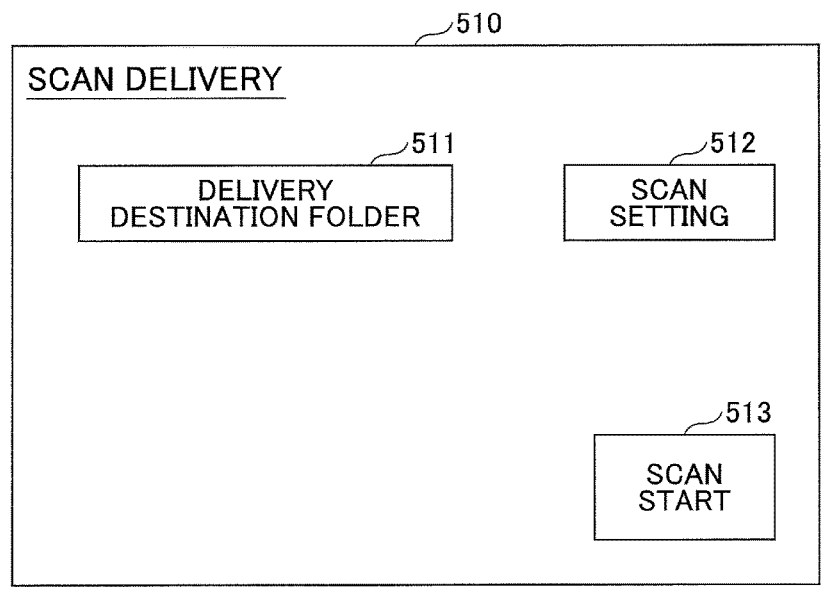
FIG. 6 is a table illustrating an example of capability information relating to scanning.
FIG. 7 is a diagram illustrating an example display of a main screen of the scan delivery application.

FIG. 6 is a table illustrating an example of capability information relating to scanning. In the example of FIG. 6, the capability information includes "available setting values" and an "initial value" for each setting item relating to scanning that can be set up via the device API 122. The "available setting values" is information indicating a value range or a list of possible values that can be set up for a corresponding setting item. The "initial value" is information indicating the initial value for a corresponding setting item. The initial value is a value that is used when a specific value is not set up for a corresponding setting item. The initial value may be a number or a character string, for example. Further, the initial value may be used as a default value.

Note that, generally, the capability information is published as part of the specification of the device API 122. As such, the step of acquiring the capability information does not necessarily have to be implemented. However, it may be convenient to acquire the capability information in order to dynamically execute a process reflecting a new setting item that has been added as a result of upgrading the device control unit 121, for example.

Then, the scan delivery application 23 displays a main screen of the scan delivery application 23 on the display device 211 (step S104).

FIG. 7 illustrates an example display of a main screen 510 of the scan delivery application 23. In FIG. 7, the main screen 510 includes a delivery destination folder button 511, a scan setting button 512, and a scan start button 513.

The delivery destination folder button 511 is a button for accepting a delivery destination setting for image data of a scanned document (hereinafter referred to as "scanned image"). The scan setting button 512 is a button for accepting a setting instruction to specify settings related to scanning. The scan start button 513 is a button for accepting a scan start instruction.

When the delivery destination folder button 511 is selected by the user (step S105), the scan delivery application 23 displays a delivery destination selection screen on the display device 211 (step S106). The delivery destination selection screen is configured to enable selection of a delivery destination folder for the scanned image. Note that the delivery destination selection screen corresponds to a feature that is not implemented by the scan application 22a. That is, the scan application 22a does not have the function of delivering the scanned image to a delivery destination. Accordingly, in the present embodiment, implementations relating to the delivery destination selection screen have to be performed based on the scan delivery application 23.

When a delivery destination is selected via the destination selection screen (step S107), the scan delivery application 23 stores the selected delivery destination in the memory 202 and hides (stops displaying) the destination selection screen. As a result, the main screen 510 is displayed.

Then, when the scan setting button 512 is selected by the user (step S108), the scan delivery application 23 inputs a scan setting screen display request to the scan application 22a via an interface published by the scan application 22a (step S109). Note that the scan setting screen display request may specify an initial value for setting information relating to scanning (hereinafter referred to as "initial setting value"). The initial setting value corresponds to an initial value for a setting to be reflected in the scan setting screen at the time the scan setting screen is displayed. Thus, the initial setting value does not necessarily have to be the same as the initial value of the capability information. That is, a recommended value for the scan delivery application 23 may be specified as the initial setting value for the scan setting screen.

Also, the initial setting values specified in the scan setting screen display request may have the same configuration as the capability information relating to scanning. That is, the initial setting values specified in scan setting screen display request may have the same configuration of setting items as the setting information relating to scanning that can be set up via the device API 122. As described in detail below, setting items that can be set up via the scan setting screen of the scan application 22a may not necessarily include all the setting items that are defined in the capability information. This is because the scan application 22a is for implementing a simple operation, and as such, setting items that can be set up may be limited to the minimum necessary. Nevertheless, in the scan setting request display request sent to the scan application 22a, initial setting values for all the setting items included in the capability information may be specified. That is, the initial setting values specified in scan setting screen display request do not depend on the configuration of the scan setting screen (are not limited to initial setting values for setting items that can be set up via the scan setting screen). Note that aspects of the above feature of the present embodiment are described in detail below. Note, however, that the format in which the initial setting values are arranged in the scan setting screen display request does not necessarily have to be the same as the format in which the setting information relating to scanning is set up via the device API 122.

Further, in some embodiments, the scan setting screen display request may specify a display control setting with respect to each component element (display component) of the scan setting screen of the scan application 22, for example. A display control setting may include, for example, a non-display control setting for hiding (not displaying) a display component or an inoperable display control setting for disabling operation of a display component. Non-display refers to a state of not displaying a display component at all. In the case where the inoperable display control setting is applied to a display component, the display component may be displayed but may be greyed out, for example, to indicate that the display component cannot be operated. For example, the scan setting screen may include a button for accepting a start instruction to start scanning, and the non-display control setting may be applied to such a button. In this way, the scan application 22a can be prevented from being started in response to a user pressing the button, for example. Note that while the scan setting screen is displayed, the scan application 22a is operated, and as such, when the button is pressed, a corresponding process may be executed by the scan application 22a.

In response to the scan setting screen display request, the scan application 22a generates a scan setting screen (step S110). At this time, the scan application 22a reflects the initial setting values specified in the scan setting screen display request that correspond to the setting items that can be set up via the scan setting screen. Also, if a display control setting is specified with respect to one or more of the display components of the scan setting screen, the corresponding display components may be hidden or displayed to indicate their inoperable status (i.e. disabled from accepting operations).

Then, the scan application 22a displays the scan setting screen on the display device 211 (step S111).

Figure 8:
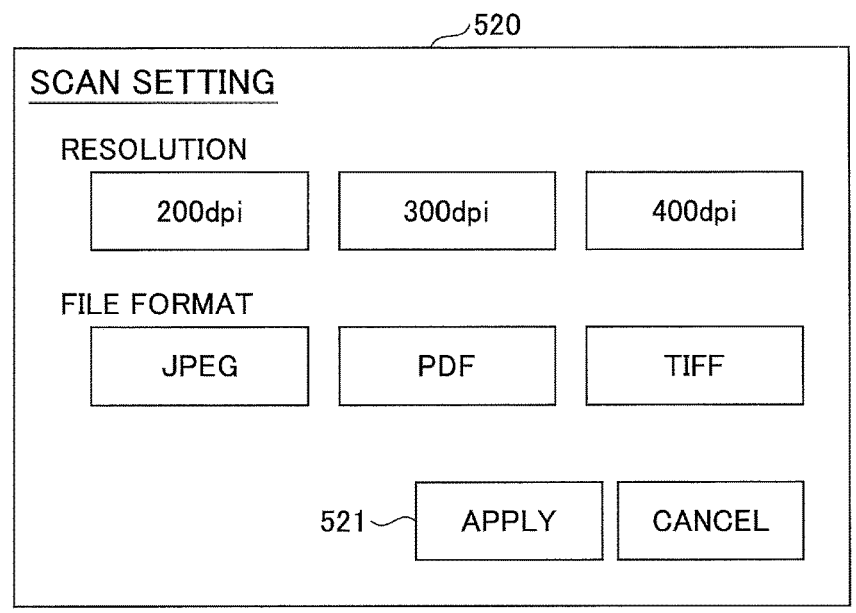
FIG. 8 is a diagram illustrating an example display of a scan setting screen.

FIG. 8 illustrates an example display of a scan setting screen 520. The scan setting screen 520 may be displayed by the scan application 22a when the scan application 22a is started. In the scan setting screen 520 of FIG. 8, only the resolution and the file format can be set up. As for the other setting items, predetermined values for the scan application 22a are used.

On the scan setting screen 520, the user may select a desired resolution and/or file format as necessary and select an "apply" button 521 (step S112). In turn, the scan application 22a stops displaying (hides) the scan setting screen 520. As a result, the main screen 510 of the scan delivery application 23 is displayed.

Then, the scan application 22a conveys the specific settings that have been set up via the scan setting screen 520 to the scan delivery application 23 as a response to the scan setting screen display request (step S113). That is, setting values set up via the scan setting screen 520 are written over the initial setting values specified in the scan setting screen display request that has been sent to the scan application 22a from the scan delivery application 23 in step S109, and the scan application 22a conveys the resulting settings to the scan delivery application 23. In other words, the specific settings conveyed to the scan delivery application 23 include setting values for all of the setting items configuring the capability information relating to scanning. Note that in the scan setting screen 520, the resolution and the file format can be set up. Thus, setting values set up for the above two setting items via the scan setting screen 520 may be written over the corresponding initial setting values specified for these two setting items in the scan setting screen display request, and resulting settings reflecting the overwritten setting values may be conveyed to the scan delivery application 23. Also, setting items other than the above two setting items may be displayed in the scan setting screen, and in this case, setting values for the other setting items may be set up in a similar manner.

Then, when the user selects the scan start button 513 on the main screen 510 (step S114), the scan delivery application 23 inputs a scan execution request to the scan application 22a via an interface published by the scan application 22a (step S115). In this case, the specific settings conveyed to the scan delivery application 23 in step S113 may be specified in the scan execution request as is. That is, the settings specified by the scan execution request may similarly have the same configuration as the setting information that can be set up via the device API 122 regardless of the setting items that can actually be set up via the scan setting screen 520. Note, however, that in some embodiments, the scan delivery application 23 may be configured to forcibly change a setting value for one or more of the setting items configuring the settings specified in the scan execution request of step S115, for example.

Then, based on the specific settings specified in the scan execution request accepted from the scan delivery application 23, the scan application 22a sends a corresponding scan execution request specifying setting information that is based on the specific settings to the device control unit 121 via the device API 122 (step S116). Note that when the format of setting information relating to scanning to be set up via the device API 122 is different from the format of the specific settings set up via the interface published by the scan application 22a, the specific settings are converted into setting information in the corresponding format for the device API 122 (setting information that is based on the specific settings). Note that when the same format is used for the specific settings set up via the interface of the scan application 22a and the setting information to be set up via the device API 122, the specific settings specified in the scan execution request accepted in step S115 may be included as is in the scan execution request sent to the device control unit 121 in step S116.

Then, the scan application 22a displays a scan progress screen on the display device 211 (step S117).

Figure 9:
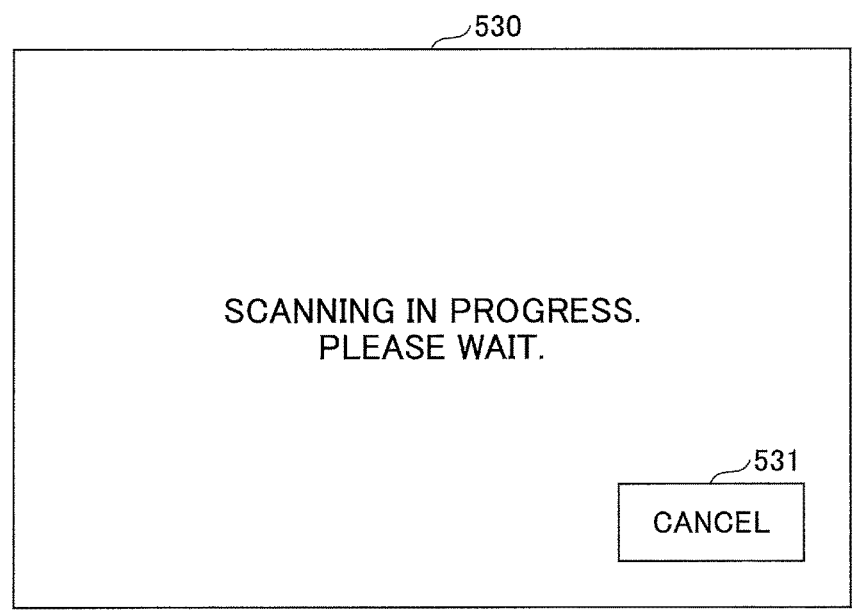
FIG. 9 is a diagram illustrating an example display of a scan progress screen.

FIG. 9 illustrates an example display of a scan progress screen 530. In FIG. 9, the scan progress screen includes a message for notifying the user that scanning is in progress, and a cancel button 531. The cancel button 531 is a button for accepting cancellation of a scan instruction. Meanwhile, the device control unit 121 that has accepted the scan execution request controls the image forming apparatus 10 to scan a document to obtain image data of the scanned document (step S118). Note that the scanning operation is performed based on the setting information specified in the scan execution request accepted in step S116. As a result, a scanned image (image data) is generated based on the specified setting information. When the scanning operation is completed, the device control unit 121 sends a response notifying the completion of the scanning operation to the scan application 22a corresponding to the sender of the scan execution request (step S119).

Upon receiving such a response from the device control unit 121, the scan application 22a stops displaying (hides) the scan progress screen 530 (step S120). Then, the scan application 22a sends the scanning completion notification to the scan delivery application 23 as a response to the scan execution request accepted in step S115 (step S121).

Then, the scan delivery application 23 executes a delivery process for delivering the scanned image generated by the scanning operation to a delivery destination that is selected via the delivery destination selection screen (step S122). Note that in some embodiments, the scanned image may be sent to the scan delivery application 23 along with the response sent in step S121, for example. Alternatively, the response sent to the scan delivery application 23 in step S121 may include identification information for identifying the scanned image generated by the image forming apparatus 10, for example. In this case, the scan delivery application 23 may specify the identification information of the scanned image in an image data delivery request and send the image data delivery request to the device control unit 121 via the device API 121, for example. In turn, the device control unit 121 may execute the delivery process for delivering the corresponding image data (scanned image) identified by the identification information to the selected delivery destination, for example. Note that the identification information may be a file path name or an ID, for example.

Note that when the cancel button 531 of the scan progress screen 530 is selected, the scan application 22a sends a scan cancellation request to the device control unit 121 via the device API 122. As a result, the scanning operation may be cancelled. Also, the scan application 22a may send a response indicating that the scanning operation has been cancelled to the scan delivery application 23 in step 121. In this case, process operations by the scan delivery application 23 may be terminated without executing the delivery process.

According to the example of FIG. 5, the scan delivery application 23 may omit implementations relating to the scan setting screen 520 and the scan progress screen 530. Generally, a large number of steps are required for implementing a screen. Thus, by omitting such steps, the implementation steps of the scan delivery application 23 may be substantially reduced.

Also, the setting information relating to scanning that is defined in the interface published by the scan application 22a has the same configuration as that of the setting information relating to scanning that is defined in the device API 122. In other words, the configuration of the setting information defined in the interface published by the scan application 22a is not dependent on the configuration of the scan setting screen 520 of the scan application 22a. Thus, even when the configuration of the scan setting screen 520 is changed as a result of function enhancement of the scan application 22a, for example, such a change in the configuration of the scan setting screen 520 does not affect the interface of the scan application 22a. In other words, the scan application 22a can maintain the compatibility of the interface that has been published, even when the configuration of the scan setting screen 520 is changed. As a result, the scan delivery application 23 may be able to use the scan setting screen 520 that has been changed without making any implementation changes.

Note that the scan application 22b similarly publishes the same interfaces as those published by the scan application 22a. Also, as with the scan application 22a, initial setting values specified in a scan setting screen display request that is sent to the scan application 22b and specific settings specified in a scan execution request that is sent to the scan application 22b are arranged to have the same configuration as that of the setting information relating to scanning that is defined in the device API 122. Thus, even when the scan application 22a is replaced by the scan application 22b, the scan delivery application 23 may be able to use a scan setting screen and a scan progress screen of the scan application 22b by executing a process procedure that is substantially identical to the process procedure illustrated in FIG. 5.

Figure 10:
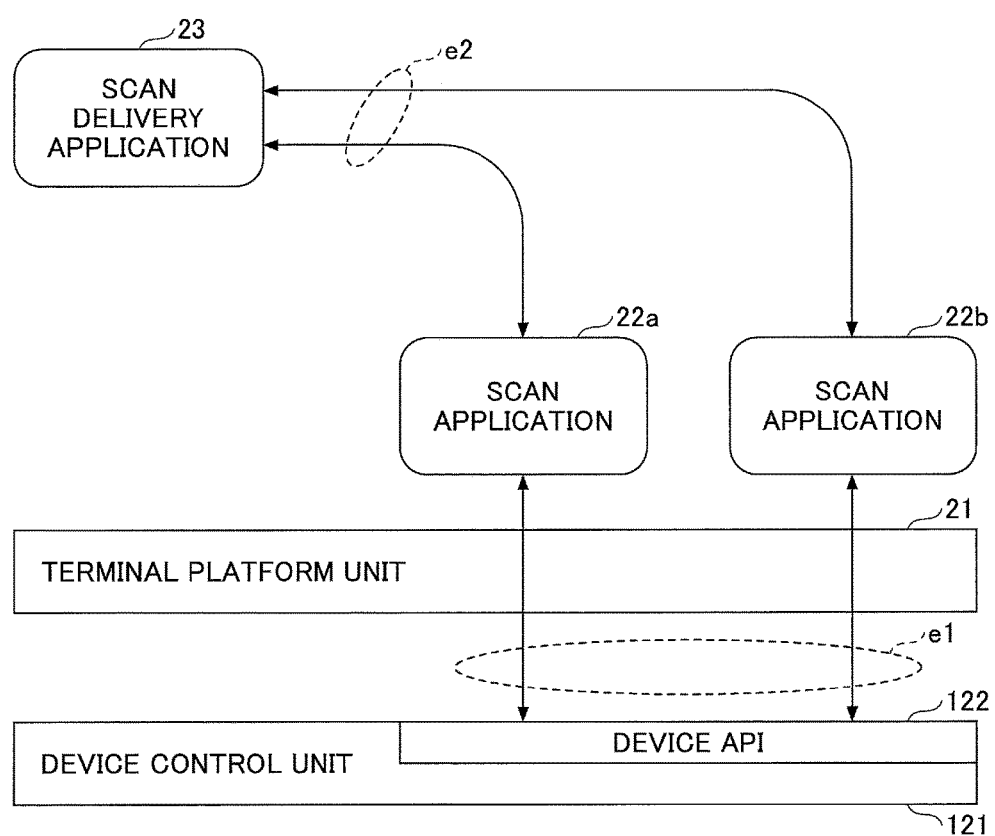
FIG. 10 is a diagram illustrating an implementation of an embodiment of the present invention.

That is, according to an aspect of the present embodiment, a situation as illustrated in FIG. 10 may be realized. FIG. 10 is a diagram illustrating an implementation of an embodiment of the present invention.

In FIG. 10, a call to the device API 122 made by the scan application 22a and a call to the device API 122 made by the scan application 22b are encircled by an ellipse e1. Also, a call to the interface of the scan application 22a made by the scan delivery application 23 and a call to the interface of the scan application 22b made by the scan delivery application 23 are encircled by an ellipse e2.

With respect to the scan application 22a, the configuration of the setting information for setting up scan settings (settings specified via the scan setting screen 520) represented by the ellipse e2 depends on the configuration of the setting information for setting up scan settings via the device API 122 represented by the ellipse e1. Also, with respect to the scan application 22b, the configuration of the setting information for setting up scan settings (settings specified by the scan setting screen of the scan application 22b) represented by the ellipse e2 depends on the configuration of the setting information for setting up scan settings via the device API 122 represented by the ellipse e1. Note that in the ellipse e1, the scan application 22a and the scan application 22b call the same device API 122. Thus, the setting information for setting up scan settings specified by the interfaces of these two scan applications 22 have the same configuration. Accordingly, the scan delivery application 23 can call the scan applications 22 without making a distinction between the interfaces of these two scan applications 22 that are encircled by the ellipse e2.

Therefore, according to an aspect of the present embodiment, implementation of an application program for a device may be simplified.

Note that in the case where both the scan application 22a and the scan application 22b are installed, the scan delivery application 23 may input a scan setting screen display request to the scan application 22a and input a scan execution request to the scan application 22b, for example. In this case, the scan setting screen may be displayed by the scan application 22a, and the scan progress screen may be displayed by the scan application 22b.

Also, the scan application 22 may publish an interface for accepting a process cancellation request, for example. In this case, when such an interface is called, the scan application 22 may cancel the process that it is currently executing. For example, the scan delivery application 23 may call such an interface when the scan delivery application 23 detects that a user has logged out or detects an abnormality.

Also, the architecture relating to the calls exchanged by the application programs may be made up of three or more layers. For example, in some embodiments, the scan delivery application 23 may publish an interface similar to that of the scan application 22. In this case, an application program using the scan delivery application 23 may input a scan setting screen display request to the scan delivery application 23, and in turn, the scan delivery application 23 may input the corresponding scan setting screen display request to the scan application 22. That is, a GUI (graphic user interface) of the scan application 22 may be implemented via the scan delivery application 23.

Note that the interface published by the scan application 22 may be implemented as a function, a method, or a message, for example.

Alternatively, in a case where the terminal platform unit 21 is implemented by Android (trademark), the interface published by the scan application 22 may be implemented as an intent, for example.

In this case, the scan application 22a and the scan application 22b may implement an activity with respect to the scan setting screen, and an activity with respect to the scan progress screen. For example, in step S109, an intent for the activity with respect to the scan setting screen may be sent to the scan application 22, and in step S115, an intent for the activity with respect to the scan progress screen may be sent to the scan application 22.

As can be appreciated, in some embodiments, the interface of the scan application 22 may be implemented using an application linking mechanism that is dependent on a particular platform, for example.

Note that although application programs relating to scanning are described above as an example, embodiments of the present invention may also be applied to application programs relating to other functions of a device. For example, in the case where the device corresponds to the image forming apparatus 10, embodiments of the present invention may be applied to application programs relating to a printing function or a copying function.

In the following, a second embodiment of the present invention is described. Note that features of the second embodiment that differ from those of the first embodiment will be described below. Thus, it may be assumed that features that are not specifically described below may be substantially identical to those of the first embodiment.

In the first embodiment described above, application programs are installed in the information processing terminal 20. In contrast, in the second embodiment, application programs are installed in the image forming apparatus 10.

Figure 11:
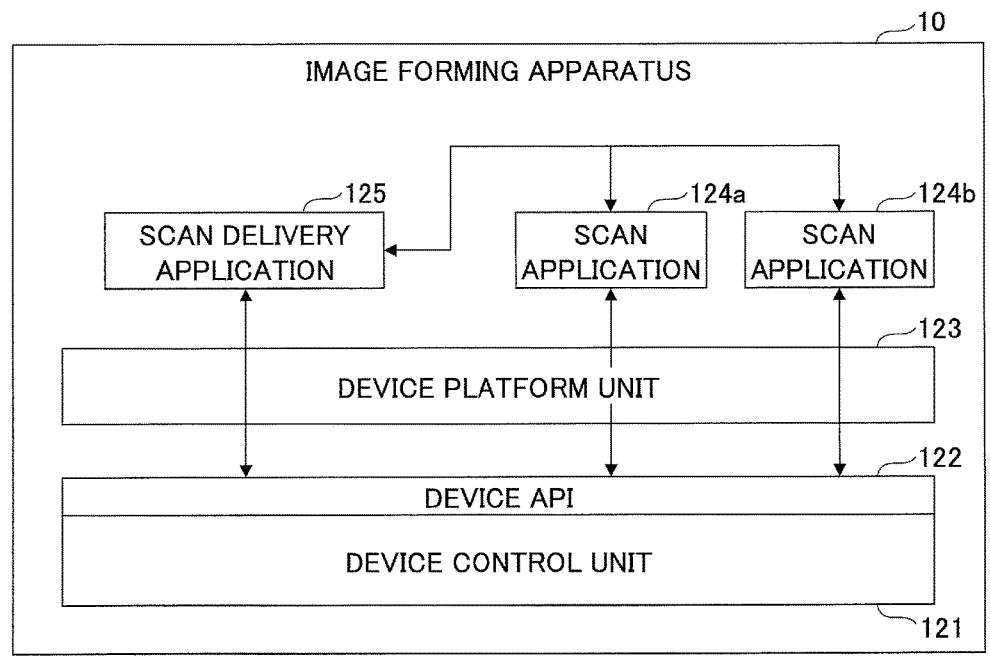
FIG. 11 is a block diagram illustrating an example functional configuration of the image forming apparatus according to a second embodiment of the present invention.

FIG. 11 is a block diagram illustrating an example functional configuration of the image forming apparatus 10 according to the second embodiment. Note that in FIG. 11, features that are identical to those illustrated in FIG. 4 are given the same reference numerals and descriptions thereof will be omitted.

In FIG. 11, the image forming apparatus 10 includes a device platform unit 123, a scan application 124a, a scan application 124b, and a scan delivery application 125 in addition to the device control unit 121.

The device platform unit 123 functions as a platform for an application program installed in the image forming apparatus 10. The device platform unit 123 may be implemented by the CPU 111 executing one or more programs installed in the image forming apparatus 10, for example.

The scan application 124a, the scan application 124b, and the scan delivery application 125 are examples application programs installed in the image forming apparatus 10. The scan application 124a, the scan application 124b, and the scan delivery application 125 are respectively application programs for implementing processes in the image forming apparatus 10 that are substantially identical to the processes implemented by the scan application 22a, the scan application 22b, and the scan delivery application 23 of FIG. 4.

In other words, the scan application 124a and the scan application 124b (hereinafter generically referred to as "scan application 124") each include an interface for accepting a request from another application program (the scan delivery application 125 in the present example). For example, the scan application 124 may include an interface for accepting a scan setting screen display request and an interface for accepting a scan execution request from another application program. The scan delivery application 125 may use the functions of the scan application 124 by calling these interfaces. In this way, the scan delivery application 125 may not have to include implementations relating to the scan setting screen and the scan progress screen to be displayed during execution of a scan job, for example.

Note that the process procedure executed in the second embodiment may be substantially identical to the process procedure illustrated in FIG. 5. In this case, the scan delivery application 23 and the scan application 22a illustrated in FIG. 5 may be replaced with the scan delivery application 125 and the scan application 124a.

In the second embodiment, the operation panel of the image forming apparatus 10 does not have to be implemented by the information processing terminal 20. For example, the operation panel does not have to be a unit that is capable of having an application program installed therein.

Note that in the above-described embodiments, the scan application 22a is an example of an application unit of the present invention. The device API 122 is an example of a first interface. The interface published by the scan application 22a is an example of a second interface. The scan setting screen 520 is an example of a first screen. The scan progress screen 530 is an example of a second screen. Although the present invention has been described above with reference to illustrative embodiments, the present invention is not limited to these embodiments, and numerous variations and modifications may be made without departing from the scope of the present invention.

Note that a person skilled in the field of information processing technology may implement the present invention using an application specific integrated circuit (ASIC) or an apparatus in which circuit modules are connected.

Further, each of the functions (units) described in connection with the above embodiments may be implemented by one or more circuits.

The one or more circuits described above may include a processor programmed by software to execute a corresponding function, and/or hardware, such as an ASIC or a circuit module, designed to execute a corresponding function, for example.

What is claimed is:

1. A device comprising:
a first processor and a second processor, different from the first processor; and
at least one memory that stores a first application program and a second application program, wherein
the first application program causes the first processor to
display a first screen configured to accept a specific setting, relating to a process to be executed by the device, from a user,
generate setting information based on the specific setting accepted from the user via the first screen,
send the setting information to the second processor via an application programming interface configured to accept a process execution request for the device from the first processor, and
switch from displaying the first screen to displaying a second screen upon sending the setting information to the second processor via the application programming interface, the second screen being a main screen of the second application configured to accept operations by the user; and
the second application program causes the second processor to
execute the process based on the received setting information, received via the application programming interface, upon receiving an execution start request via a user operation on the second screen,
accept a display request for displaying the first screen from the second application program, via an interface published by the second application, and
send acceptance information that indicates the acceptance of the specific setting to the second application program as a response to the display request, wherein
the acceptance information that is sent to the second application program has the same configuration as the setting information that is sent to the second processor via the application programming interface, and
upon receiving the execution start request, the second application sends an execution request to the first application via the interface published by the second application, the execution start request being based on the setting information as sent from the first application.

2. The device according to claim 1, wherein the first application further causes the first processor to
accept the display request that includes an initial setting value for the first screen having the same configuration as the setting information, and
display the first screen that reflects the initial setting value.

3. The device according to claim 1, wherein the first application further causes the first processor to
accept the process execution request from the second application program, via the published interface, along with the information indicating the specific setting that has been sent to the second application program, and
send to the second processor, via the application programming interface, the setting information that is based on the information indicating the specific setting that has been accepted along with the process execution request.

4. The device according to claim 3, wherein the first application program further causes the first processor to
display a third screen indicating that the process is in progress, in response to accepting the process execution request.

5. The device according to claim 3, wherein the first application program further causes the first processor to
send identification information identifying data that has been generated by the process to the first application program as a response to the process execution request.

6. The device according to claim 1, wherein the first application program further causes the first processor to
convert a format of the setting information set up via an interface published by the first application to a format of the setting information to be set up via the interface published by the second application before sending the setting information to the second processor in a case where the format of the setting information to be set up via the interface published by the second application differs from the format of the setting information set up via the interface published by the first application, and
send the setting information to the second processor without modification in a case where the format of the setting information to be set up via the interface published by the second application is the same as the format of the setting information set up via the interface published by the first application.

7. An information processing method that is implemented by a device including a first processor and a second processor, the information processing method comprising:
a second application program causing the second processor to
control the device to execute a process based on setting information received via an application programming interface that is configured to accept a process execution request for the device from the first processor; and
a first application program causing the first processor to
display a first screen that is configured to accept a specific setting relating to the process from a user,
generate the setting information based on the specific setting accepted from the user via the first screen,
send the setting information to the second processor via the application programming interface,
switch from displaying the first screen to displaying a second screen upon sending the setting information to the second processor via the application programming interface, the second screen being a main screen of the second application configured to accept operations by the user; and
accept a display request for displaying the first screen from the second application program, via an interface published by the second application program, and
send acceptance information that indicates the acceptance of the specific setting to the second application program as a response to the display request, wherein
the acceptance information sent to the second application program has the same configuration as the setting information sent to the second processor via the application programming interface, and upon receiving the execution start request input via a user operation on the second screen, the second application sends an execution request to the first application via the interface published by the second application, the execution request being based on the setting information as sent from the first application.

8. The information processing method according to claim 7, wherein the first application program further causes the first processor to accept the display request that includes an initial setting value for the first screen having the same configuration as the setting information, and display the first screen that reflects the initial setting value.

9. The information processing method according to claim 7, wherein the first application further causes the first processor to accept from the second application program, via the published interface, the process execution request along with the information indicating the specific setting that has been sent to the second application program, and sends to the second processor, via the application programming interface, the setting information that is based on the information indicating the specific setting that has been accepted along with the process execution request.

10. The information processing method according to claim 9, wherein the first application program further causes the first processor to display a third screen indicating that the process is in progress in response to accepting the process execution request.

11. The information processing method according to claim 9, wherein the first application program further causes the first processor to send identification information identifying data that has been generated by the process to the second application program as a response to the process execution request.

12. The information processing method according to claim 7, wherein the first application program further causes the first processor to convert a format of the setting information set up via an interface published by the first application to a format of the setting information to be set up via the interface published by the second application before sending the setting information to the second processor in a case where the format of the setting information to be set up via the interface published by the second application differs from the format of the setting information set up via the interface published by the first application, and send the setting information to the second processor without modification in a case where the format of the setting information to be set up via the interface published by the second application is the same as the format of the setting information set up via the interface published by the first application.

13. A computer program product comprising a non-transitory computer-readable medium having a program recorded thereon that is executable by a device that includes a first processor and a second processor, the program when executed causing the second processor to control the device to execute a process based on setting information received via an application programming interface configured to accept a process execution request for the device from the first processor; and the first processor to display a first screen configured to accept a specific setting relating to the process from a user, generate the setting information based on the specific setting accepted from the user via the first screen, send the setting information to the second processor via the application programming interface, switch from displaying the first screen to displaying a second screen upon sending the setting information to the second processor via the application programming interface, the second screen being a main screen of the second application configured to accept operations by the user; and accept a display request for displaying the first screen from a second application program installed in the device, via an interface published by the second application program, and send acceptance information that indicate the acceptance of the specific setting to the second application program as a response to the display request, wherein the acceptance information sent to the second application program has the same configuration as the setting information sent to the second processor via the application programming interface, and upon receiving the execution start request input via a user operation on the second screen, the second application sends an execution request to the first application via the interface published by the second application, the execution start request being based on the setting information as sent from the first application.

14. The computer program product according to claim 13, wherein the program further causes the first processor to accept the display request that includes an initial setting value for the first screen having the same configuration as the setting information, and display the first screen that reflects the initial setting value.

15. The computer program product according to claim 13, wherein the program further causes the first processor to accept from the second application program, via the published interface, the process execution request along with the information indicating the specific setting that has been sent to the second application program, and sends to the second processor, via the application programming interface, the setting information that is based on the information indicating the specific setting that has been accepted along with the process execution request.

16. The computer program product according to claim 15, wherein the program further causes the first processor to display a third screen indicating that the process is in progress in response to accepting the process execution request.

17. The computer program product according to claim 15, wherein the program further causes the first processor to send identification information identifying data that has been generated by the process to the second application program as a response to the process execution request.

18. The computer program product according to claim 13, wherein the program further causes the first processor to convert a format of the setting information set up via an interface published by the first application to a format of the setting information to be set up via the interface published by the second application before sending the setting information to the second processor in a case where the format of the setting information to be set up via the interface published by the second application differs from the format of the setting information set up via the interface published by the first application, and
send the setting information to the second processor without modification in a case where the format of the setting information to be set up via the interface published by the second application is the same as the format of the setting information set up via the interface published by the first application.

\* \* \* \* \*